US012546054B2

(12) United States Patent
Bray

(10) Patent No.: US 12,546,054 B2
(45) Date of Patent: Feb. 10, 2026

(54) LAUNDRY DOOR ENGAGEMENT SYSTEMS AND METHODS

(71) Applicant: Brayniacs LLC, Denver, CO (US)

(72) Inventor: Cynthia Moltz Bray, Denver, CO (US)

(73) Assignee: Cynthia Moltz Bray, Denver, CO (US)

( * ) Notice: Subject to any disclaimer, the term of this patent is extended or adjusted under 35 U.S.C. 154(b) by 867 days.

(21) Appl. No.: 17/744,152

(22) Filed: May 13, 2022

(65) Prior Publication Data

US 2022/0364292 A1 Nov. 17, 2022

Related U.S. Application Data

(60) Provisional application No. 63/189,112, filed on May 15, 2021.

(51) Int. Cl.
*D06F 39/14* (2006.01)
*F26B 5/16* (2006.01)

(52) U.S. Cl.
CPC ................ *D06F 39/14* (2013.01); *F26B 5/16* (2013.01)

(58) Field of Classification Search
CPC .................................. D06F 39/14; F26B 5/16
USPC ............................................................ 34/196
See application file for complete search history.

(56) References Cited

U.S. PATENT DOCUMENTS

2012/0227278 A1* 9/2012 Trentacosta .............. F26B 5/16 34/329
2013/0008047 A1* 1/2013 Hunt ....................... D06F 39/14 34/218
2019/0136593 A1* 5/2019 McCallister ............ D06F 39/14

FOREIGN PATENT DOCUMENTS

EP 3031978 A1 * 6/2016 ............. D06F 58/00

OTHER PUBLICATIONS

Washing Machine Lasso, Outdoor Woman's, retrieved from the Internet on Aug. 16, 2022: URL: https://www.outdoorwomans.com/product/washing-machine-lasso-front-load-washer-door-prop-magnetic-washing-machine-door-holder-washer-dryer-door-prop-for-washing-machine-front-load-washer-hook-laundry-lasso-keep-washer-door-open/.

* cited by examiner

*Primary Examiner* — Connor J Tremarche
(74) *Attorney, Agent, or Firm* — Acuity IP, LLC; Nathan S. Cassell

(57) ABSTRACT

Systems and methods encompass the use and manufacture of a washing machine door prop with attachments to dry the washer interior and gasket, and to absorb lingering ambient moisture and odor.

9 Claims, 4 Drawing Sheets

LAUNDRY DOOR ENGAGEMENT SYSTEMS AND METHODS

CROSS-REFERENCES TO RELATED APPLICATIONS

This application claims the benefit of U.S. Provisional Patent Application No. 63/189,112 filed May 15, 2021, the content of which is incorporated herein by reference.

FIELD OF THE INVENTION

Embodiments of the present invention encompass systems and methods for propping the door of a washing machine open with an attachment to manually dry the interior door, drum, and gasket, and an attachment to absorb ambient moisture from the environment. Embodiments of the present invention additionally reduce the likelihood of mold and mildew forming which reduces odor and extends the life of the gasket and the machine.

BACKGROUND OF THE INVENTION

Washing machines are frequently wet, allowing mold and mildew to form in the wet environment of the machine interior and the rubber gasket. Many consumers report an odor from their appliances, particularly front-loading washers. Many consumers are aware that leaving the washer door ajar can reduce the problem, but do not do so because it is inconvenient or the door slams shut. Consumers often wait until the problem has gotten severe before cleaning with bleach or other washing machine sanitizers on the market, or replacing the moldy parts. Some consumers eschew front-loading washers because of the problem. In some instances, consumers use a prop to prevent the door from closing. Although such props may provide benefits to the consumer, still further improvements are desired. Embodiments of the present invention provide solutions for at least some of these outstanding needs.

BRIEF SUMMARY OF THE INVENTION

Embodiments of the present invention encompass systems and methods which include a combination of a door prop and a drying mechanism, and/or a method to absorb ambient moisture from the washing machine. The combination of leaving the washer door ajar after a thorough manual drying plus a method to absorb moisture from the environment will prevent problems which consumers currently encounter. Embodiments of the presentation invention provide systems and methods that operate to prevent mold, mildew, and odor from forming in the washing machine interior and gasket. Exemplary embodiments are simple, convenient, easy to use, affordable, durable, and gentle on the appliance. Further, exemplary embodiments can be washable/renewable, non-toxic, and/or include replaceable/replenishable parts.

In some cases, embodiments encompass a washing machine device that includes a center wand with an attachment system for a removable, absorbent material to manually dry the gasket on one end, and an attachment system for a removable, moisture-absorbing medium to be inserted into the other end. In use, such a device can rest on the washing machine door of front-loading washers to prevent the door from closing when the appliance is not in use. The product can also be used in top-loading washing machines. In some cases, a device may have an attachment system that includes a microfiber or other absorbent fabric which can be easily removed by the consumer to wash it separately. In use, the microfiber or absorbent fabric can be used to conveniently dry the drum and gasket manually. In some embodiments, a device includes a rechargeable or replaceable cartridge containing a material (optionally, non-toxic) that absorbs ambient moisture. In some cases, an attachments system of the device can be permanently affixed to the center wand, or it may be separate until snapped, clipped, or threaded to the ends of the center wand.

In one aspect, embodiments of the present invention encompass systems and methods for maintaining a laundry washing machine. An exemplary method of maintaining a laundry washing machine using a laundry door engagement system can include drying, propping, and absorbing steps. For example, a method may include drying a gasket and a drum of the laundry washing machine with a drying mechanism of the laundry door engagement system, propping open a door of the laundry washing machine with a central wand of the laundry door engagement system, and absorbing ambient moisture from a drum of the laundry washing machine with an absorbing mechanism of the laundry door engagement system. The absorbing mechanism can be attached with a proximal section of the central wand, and the drying mechanism can be attached with a distal section of the central wand. In some cases, methods can include removing the absorbing mechanism from the central wand and attaching a replacement absorbing mechanism to the central wand. In some cases, methods can include removing the drying mechanism from the central wand and attaching a replacement drying mechanism to the central wand. In some cases, the drying mechanism can include fabrics or materials manufactured from or including microfiber, cotton, chamois, flannel, wool, sponge, rayon, polyester, or any combination thereof. In some cases, the absorbing mechanism can include materials manufactured from or including charcoal, volcanic rock, clay, kitty litter, silica, gel, or any combination thereof. Kitty litter may include a bentonite, such as sodium bentonite or calcium bentonite. In some cases, the central wand includes a curved upper section, and the step of propping open the door of the laundry washing machine includes resting the curved upper section of the central wand on top of the door of the laundry washing machine. In some cases, the distal section of the central wand includes a male member, and the drying mechanism includes a female member that receives the male member. In some cases, the distal section of the central wand includes a female member, and the drying mechanism includes a male member that inserts into the female member. In some cases, the proximal section of the central wand includes a hollow receptacle that receives the absorbing mechanism.

In another aspect, embodiments of the present invention encompass methods that include drying a gasket and a drum of the laundry washing machine with a drying mechanism of the laundry door engagement system, and propping open a door of the laundry washing machine with a central wand of the laundry door engagement system. The drying mechanism can be attached with a distal section of the central wand. In some cases, methods can also include removing the drying mechanism from the central wand and attaching a replacement drying mechanism to the central wand. In some cases, the drying mechanism can include fabrics or materials manufactured from or including microfiber, cotton, chamois, flannel, wool, sponge, rayon, polyester, or any combination thereof. In some cases, the central wand includes a curved upper section, and the step of propping open the door of the laundry washing machine includes resting the curved upper section of the central wand on top of the door of the laundry washing machine. In some cases, the distal section of the central wand includes a male member, and the drying mechanism includes a female member that receives the male member. In some cases, the distal section of the central wand includes a female member, and the drying mechanism includes a male member that inserts into the female member.

In another aspect, embodiments of the present invention encompass methods that include propping open a door of the laundry washing machine with a central wand of the laundry door engagement system, and absorbing ambient moisture from a drum of the laundry washing machine with an absorbing mechanism of the laundry door engagement system. The absorbing mechanism can be attached with a proximal section of the central wand. In some cases, methods also include removing the absorbing mechanism from the central wand and attaching a replacement absorbing mechanism to the central wand. In some cases, the absorbing mechanism can include materials manufactured from or including charcoal, volcanic rock, clay, kitty litter, silica, gel, or any combination thereof. Kitty litter may include a bentonite, such as sodium bentonite or calcium bentonite. In some case, the central wand includes a curved upper section, and the step of propping open the door of the laundry washing machine includes resting the curved upper section of the central wand on top of the door of the laundry washing machine. In some cases, the proximal section of the central wand includes a hollow receptacle that receives the absorbing mechanism.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

All illustrations of the drawings are to be describing selected embodiments of the present invention and are not intended to limit the scope of the present invention. All references of user or users pertain to either individual or individuals who would utilize embodiments of the present invention.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising" when used in this specification, especially the presence of stated features, steps, operations, elements, and/or components do not preclude the presence or addition of one or more other features, steps, operations, elements, components, and/or groups thereof.

A washing machine door prop for facilitating moisture absorption and evaporation and for inhibiting mold, mildew, and odor in the washing machine interior and in the gasket is discussed herein.

The present disclosure is provided for purposes of exemplification of the invention only, and is not intended to limit the invention to the specific embodiments, materials, or processes illustrated by the figures or description contained herein.

Figure 1:
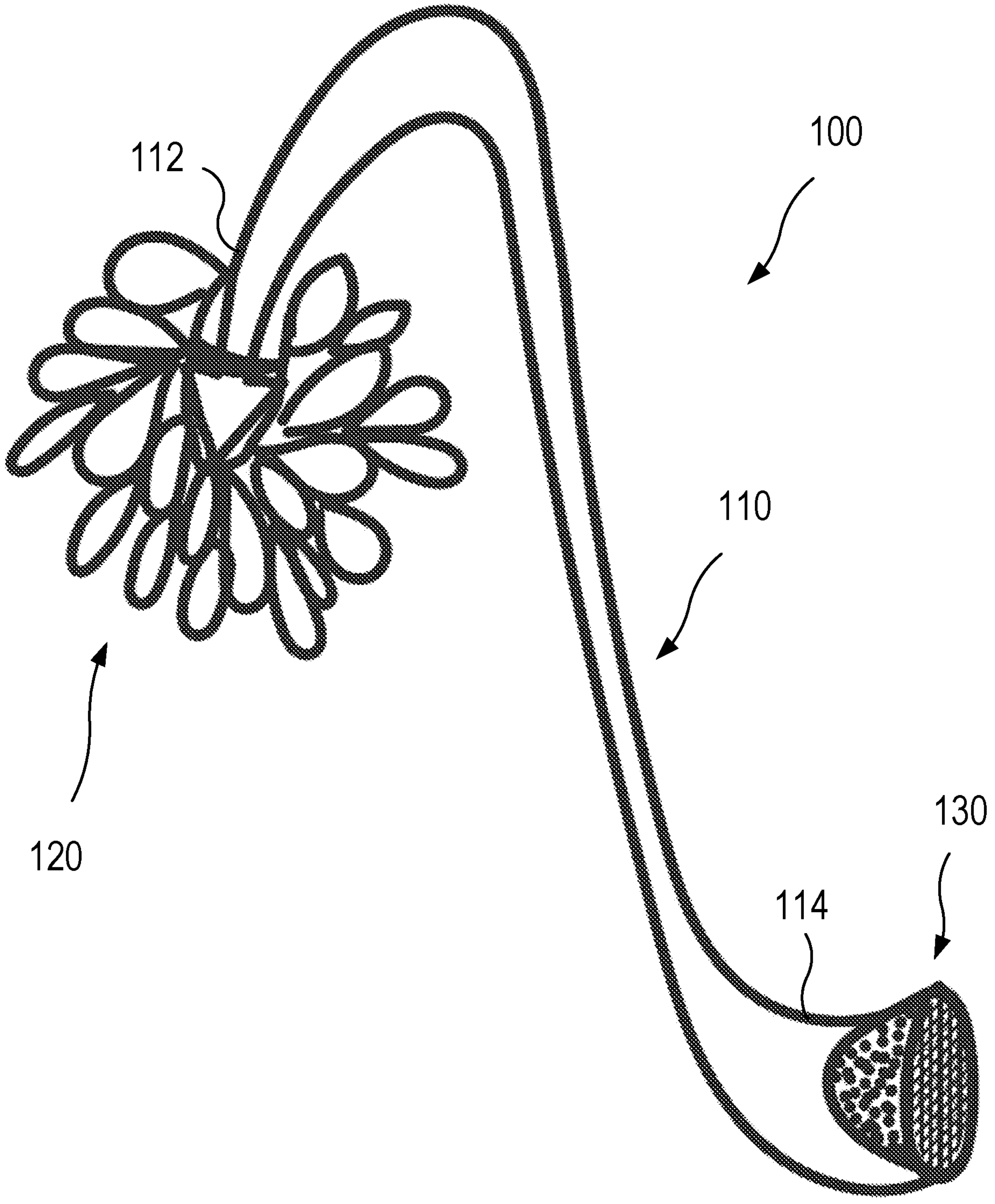
FIG. 1 depicts a side perspective view of one example of an assembled center wand with a drying attachment on one end, and a moisture absorbing module on the other end, according to various embodiments of the present invention.

Embodiments of the present invention will now be described by referencing the appended figures. Turning now to the drawings, FIG. 1 depicts a side perspective view of a laundry door engagement system 100, according to embodiments of the present invention. As shown here, laundry door engagement system 100 includes a center wand 110 with a drying attachment or mechanism 120 on one end (e.g. distal section 112 of wand 110) and a moisture absorbing module or mechanism 130 on the other end (e.g. proximal end 114 of wand 110) according to various embodiments of the present invention.

Figure 2:
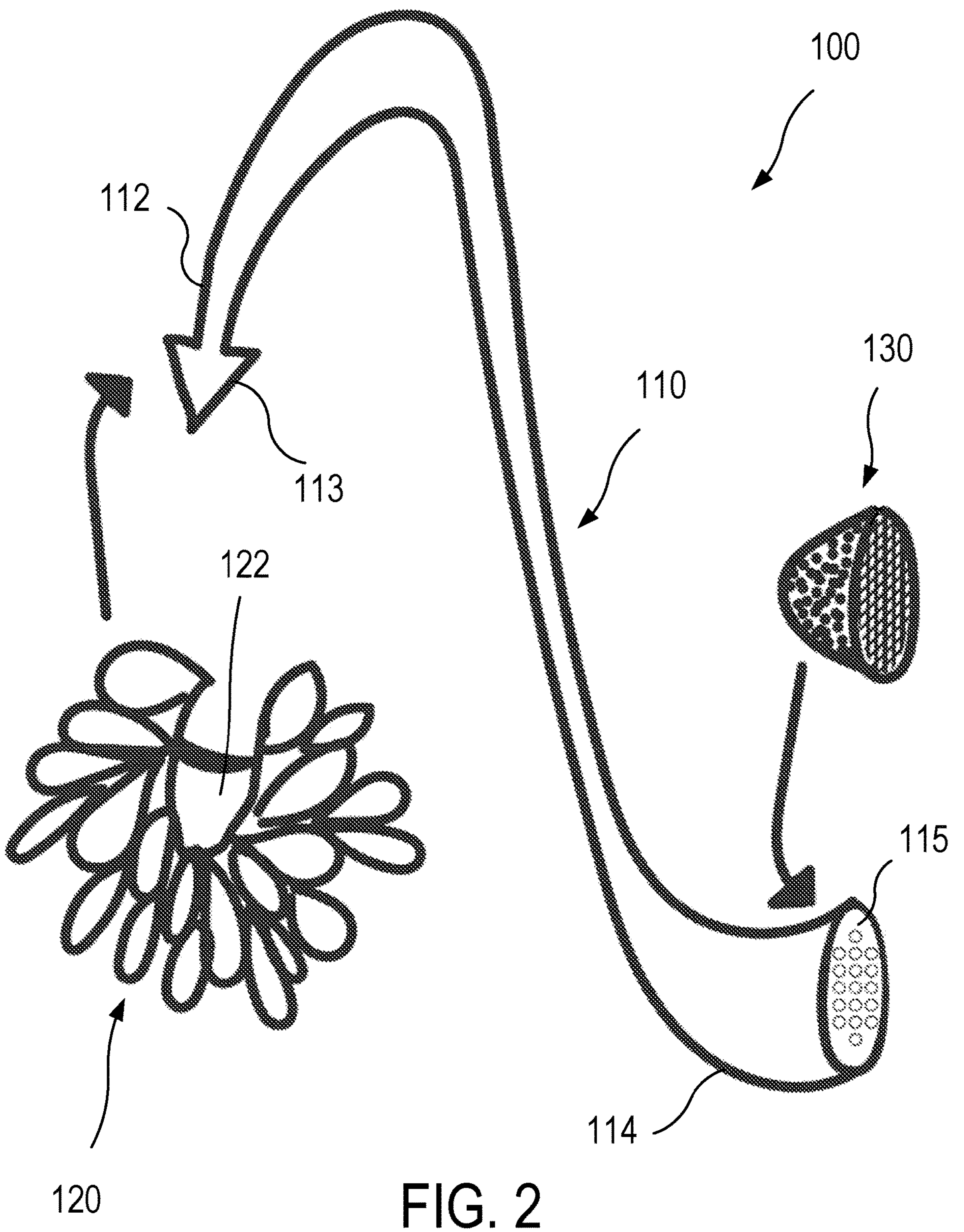
FIG. 2 depicts a substantially side perspective view of one example of an unassembled center wand and the separate drying attachment and moisture absorbing module components, according to various embodiments of the present invention.

As shown in FIG. 2, the center wand 110 can be "S" shaped and circular with a pointy mounting area 113 on one end (e.g. distal section 112) and a hollow receptacle on the other (e.g. proximal section 114), but the center wand need not be limited to this shape. The center wand 110 may have the ability to receive a plurality of attachment mechanisms. For example, the distal section 112 and/or the proximal section 114 may include a coupling element such as a male element or a female element, or some other coupling mechanism. As shown here, distal section 112 includes a male element 113 that is configured to slide into a female opening or element 122 of a drying attachment or mechanism 120, such as a drying cloth. Any of a variety of coupling or fastening mechanisms can be used to couple an attachment mechanism (e.g. drying attachment 120 or absorbing attachment) with the wand 110. A non-exhaustive list for such coupling or fastening mechanisms include a clip to attach, an attached clip, an attachment for a cord, and/or an attachment for an elastic, but is not limited to these fasteners. In this example, the hollow receptacle 115 may have male elements and female elements to house a removable/replaceable/rechargeable moisture absorbing matter 130. The elements, attachment mechanisms, and attachments are not limited to this number, shape, design, or material.

The center wand 110 may be made from plastic, silicone, rubber, foam, nylon, metal, or a combination of these materials, but is not limited to these materials. The attachment mechanism (e.g. drying attachment 120 or moisture absorbing attachment 130) may be made from fabric, charcoal, volcanic rock, plastic, nylon, metal, and/or silicone, or a combination of these materials, but is not limited to these materials.

In some embodiments, the above mentioned components of the center wand 110 may be molded from a single piece of material such as plastic, silicone, or rubber but is not limited to this number or these materials.

Figure 3:
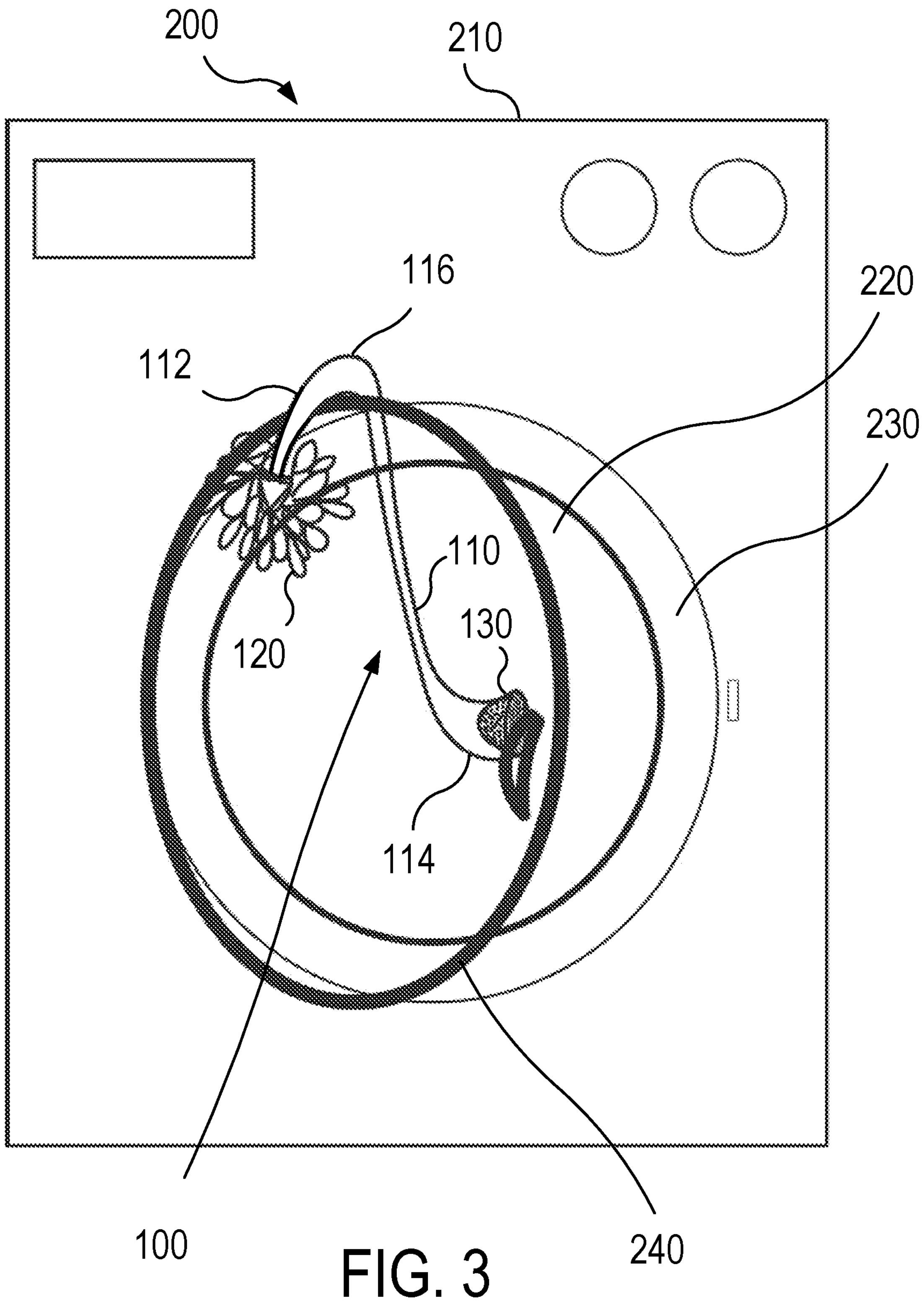
FIG. 3 depicts a substantially front perspective view of one example of how the device can prop open the door of a front-loading washing machine, according to various embodiments of the present invention.

As shown in FIG. 3, a laundry door engagement system 100 can be used to prop open a door of a laundry machine 200 (e.g. such as a washing machine). The laundry machine 200 includes a main body 210 having an interior drum 220 and gasket 230, and a washing machine door 240 coupled with the main body 210 (e.g. via a hinge). The laundry door engagement system 100 includes a center wand 110 having or coupled with a drying mechanism or attachment 120 that can be used to manually dry the washing machine interior (e.g. drum 220) and gasket 230. Center wand 110 also has or includes an absorbing mechanism or attachment 130 that can be used to absorb ambient moisture in order to reduce the formation of mold, mildew, and odor. In some cases, the system 100 can operate to prevent the door 240 of a washing machine 200 from closing by providing a physical barrier which may be provided as a wand or base structure 110 made of silicone, plastic, rubber, nylon, fabric, mesh, or a combination of these. As shown in FIG. 3, a distal section 112 of the wand 110 is positioned outside of the machine 200 in front of the door 240, and a proximal section 114 of the wand is positioned behind the door 240 (e.g. within the drum 220). A curved section 116 of the want 110 rests upon the top portion of the door 240.

In some cases, system 100 includes a drying mechanism 120 that can be used to manually dry the washing machine interior or drum 220 and gasket 230 with an absorbent material such as microfiber or cotton, attached to the center wand structure 110 with any of a variety of coupling or fastening mechanisms, including without limitation buttons, clips, bands, elastic, cords, compression, and/or threaded screws. In some cases, system 100 includes an absorbing mechanism 130 that can be used to absorb ambient moisture with an absorbent material such as volcanic rock, silica, charcoal, or other medium, attached to the center wand structure 110 with any of a variety of coupling or fastening mechanisms, including without limitation buttons, clips, bands, elastic, cords, snaps, compression, and/or threaded screws.

Advantageously, in operation the system 100 is gentle on the washing machine so as not to cause damage to the appliance. In some instances, one or more components of the system 100 can be manufactured from or include one or more non-toxic materials.

Figure 4:
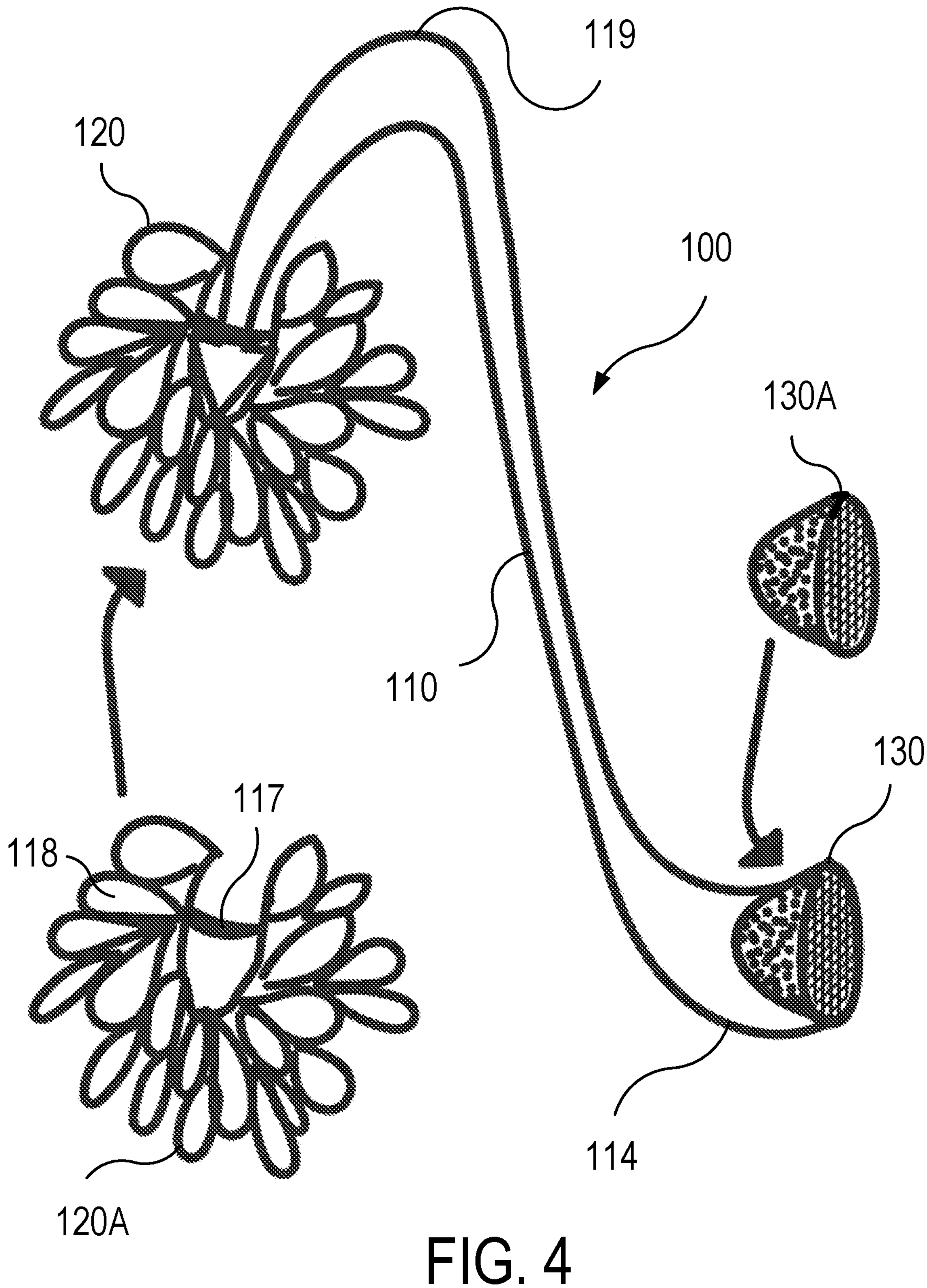
FIG. 4 depicts a side perspective view of one example of an assembled center wand describing how the product might be used, how a drying attachment might attach on one, and how a moisture absorbing module might attach on the other end, according to various embodiments of the present invention.

In some cases, the system 100 may have changeable, washable, and/or replaceable parts. As shown in FIG. 4, the system 110 includes a wand 110, at least a portion of which may have a cylindrical shape, and an be used to prop open the washer door when it rests on top. For example upper section 119 of the wand 110 may rest on top of a washing machine door. System 100 can also include a drying mechanism 120 to manually dry the gasket on one end, and an absorbing mechanism or medium 130 to absorb ambient moisture and odor on the other end. As shown here, the attachments 120, 130 may be replaceable (e.g. by swapping out with replacement attachments 120A, 130A). Removeable/replacement attachments or cartridges 130, 130A can include a moisture and odor-absorbing matter (optionally, non-toxic). The cartridge 130, 130A may screw or snap into the hollow opening of the center wand 110 (e.g. at proximal section 114). The drying mechanism 120 can include a removable/replaceable/washable absorbent fabric that is used to manually dry the gasket of a washing machine. In some cases, the fabric 118 may attach to the center wand 110 with an elastic band 117.

All features of the described systems and devices are applicable to the described methods mutatis mutandis, and vice versa. Embodiments of the present invention encompass kits having systems for propping, drying, and/or absorbing as disclosed herein. In some embodiments, the kit includes one or more systems for propping a laundry machine door, drying one or more components of a laundry machine, and/or absorbing moisture from a laundry machine, along with instructions for using the system for example according to any of the methods disclosed herein.

Each reference provided herein in incorporated by reference in its entirety to the same extent as if each reference was individually incorporated by reference. Relatedly, all publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

Although the present invention has been illustrated and described herein with reference to preferred embodiments and specific examples thereof (e.g. in some detail by way of illustration and example for purposes of clarity of understanding), it will be readily apparent to those of ordinary skill in the art that other embodiments and examples may perform similar functions and/or achieve like results, and that many other possible modifications and variations can be made without departing from the spirit and scope of the invention, including certain changes, modifications, alternate constructions, and/or equivalents which may be practiced or employed as desired. All such equivalent embodiments and examples are within the spirit and scope of the present invention, are contemplated thereby, and are intended to be covered by the following claims.

What is claimed is:

1. A method of maintaining a laundry washing machine using a laundry door engagement system, the method comprising:

drying a gasket and a drum of the laundry washing machine with a drying mechanism of the laundry door engagement system;

propping open a door of the laundry washing machine with a central wand of the laundry door engagement system; and absorbing ambient moisture from a drum of the laundry washing machine with an absorbing mechanism of the laundry door engagement system, wherein the absorbing mechanism is attached with a proximal section of the central wand, and wherein the drying mechanism is attached with a distal section of the central wand.

2. The method according to claim 1, further comprising removing the absorbing mechanism from the central wand and attaching a replacement absorbing mechanism to the central wand.

3. The method according to claim 1, further comprising removing the drying mechanism from the central wand and attaching a replacement drying mechanism to the central wand.

4. The method according to claim 1, wherein the drying mechanism comprises a member selected from the group consisting of microfiber, cotton, chamois, flannel, wool, sponge, rayon, and polyester.

5. The method according to claim 1, wherein the absorbing mechanism comprises a member selected from the group consisting of charcoal, volcanic rock, clay, kitty litter, silica, and gel.

6. The method according to claim 1, wherein the central wand comprises a curved upper section, and the step of propping open the door of the laundry washing machine comprises resting the curved upper section of the central wand on top of the door of the laundry washing machine.

7. The method according to claim 1, wherein the distal section of the central wand comprises a male member, and wherein the drying mechanism comprises a female member that receives the male member.

8. The method according to claim 1, wherein the distal section of the central wand comprises a female member, and wherein the drying mechanism comprises a male member that inserts into the female member.

9. The method according to claim 1, wherein the proximal section of the central wand comprises a hollow receptacle that receives the absorbing mechanism.

* * * * *